United States Patent Office 3,443,623
Patented May 13, 1969

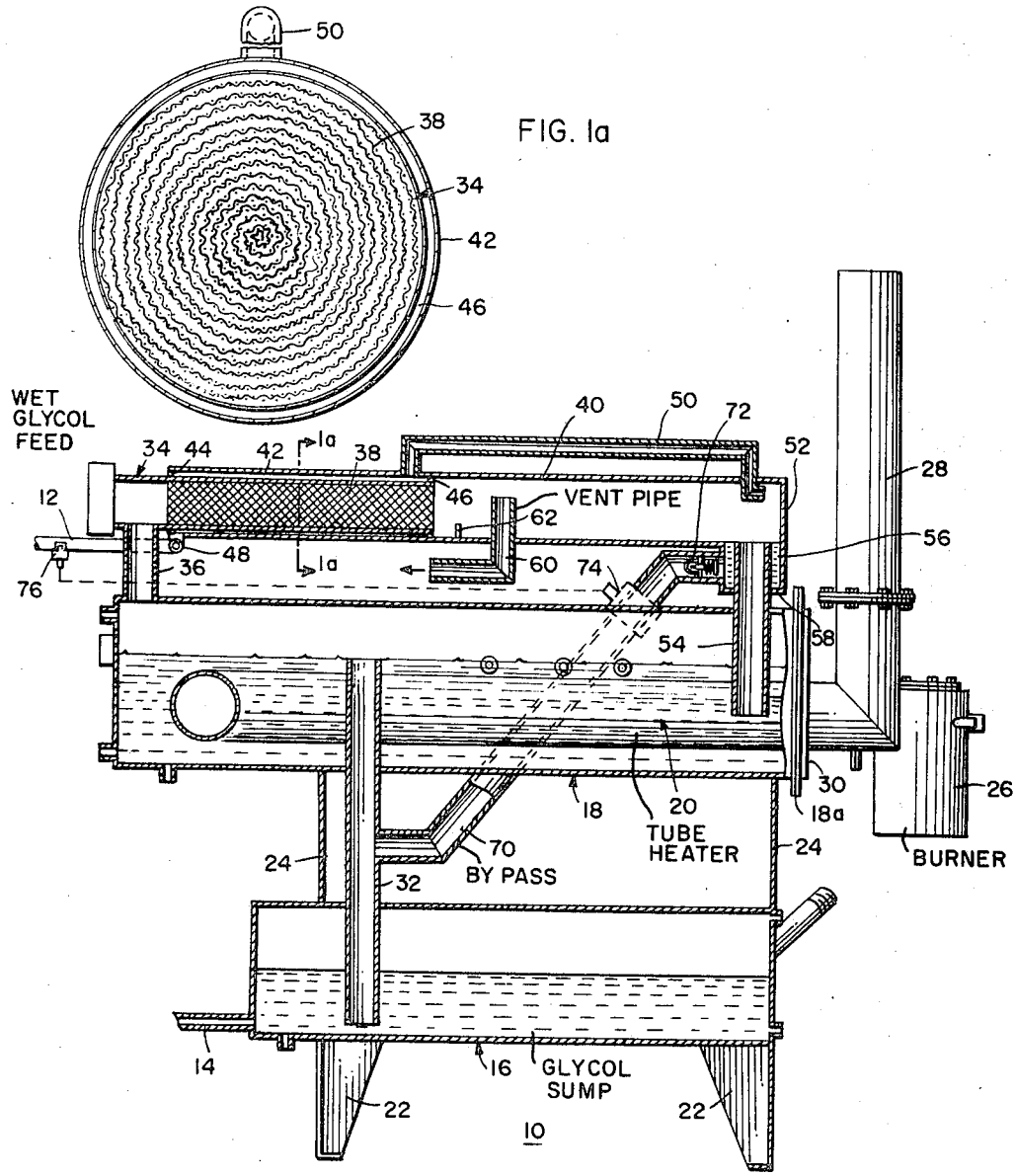

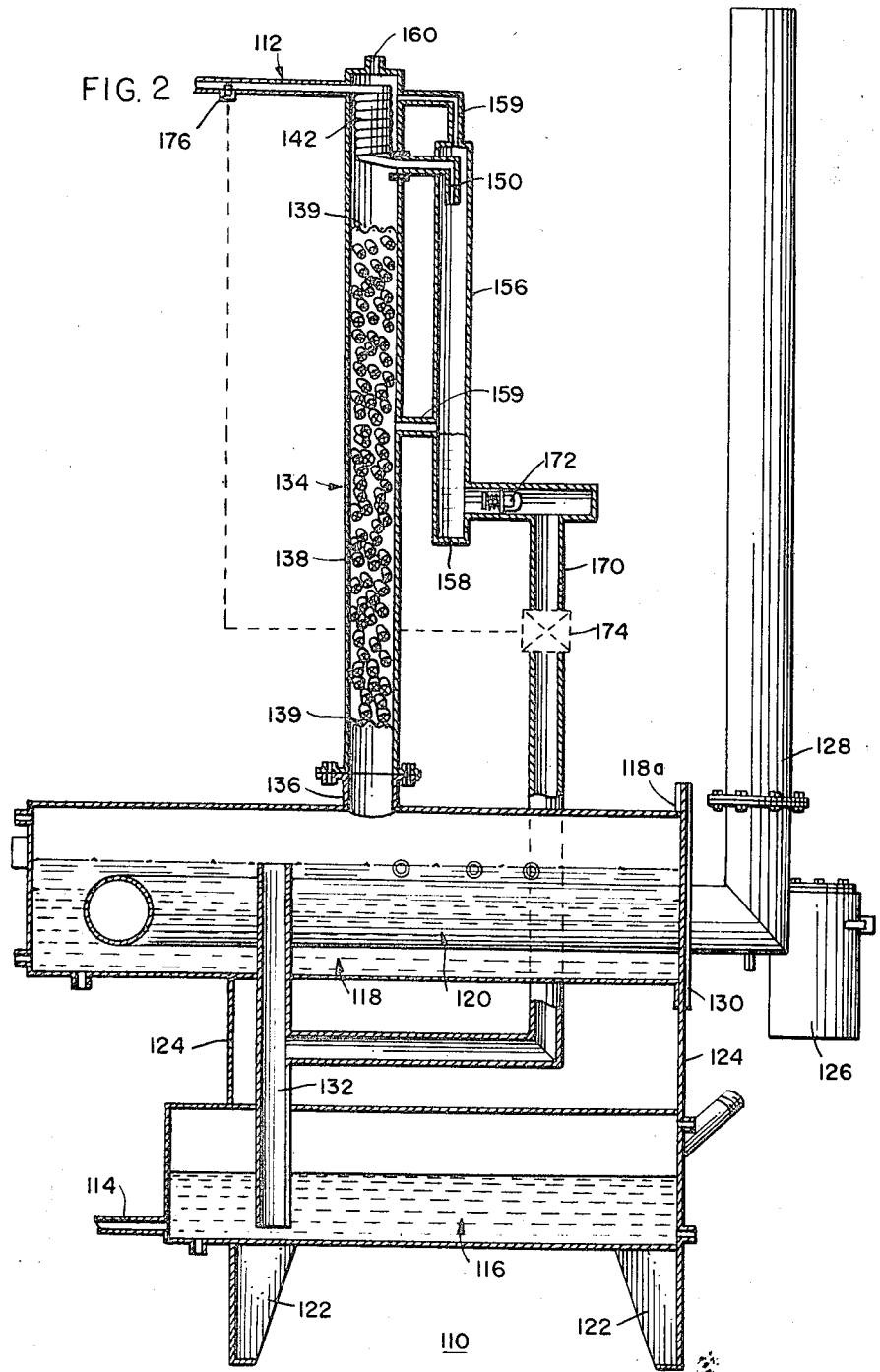

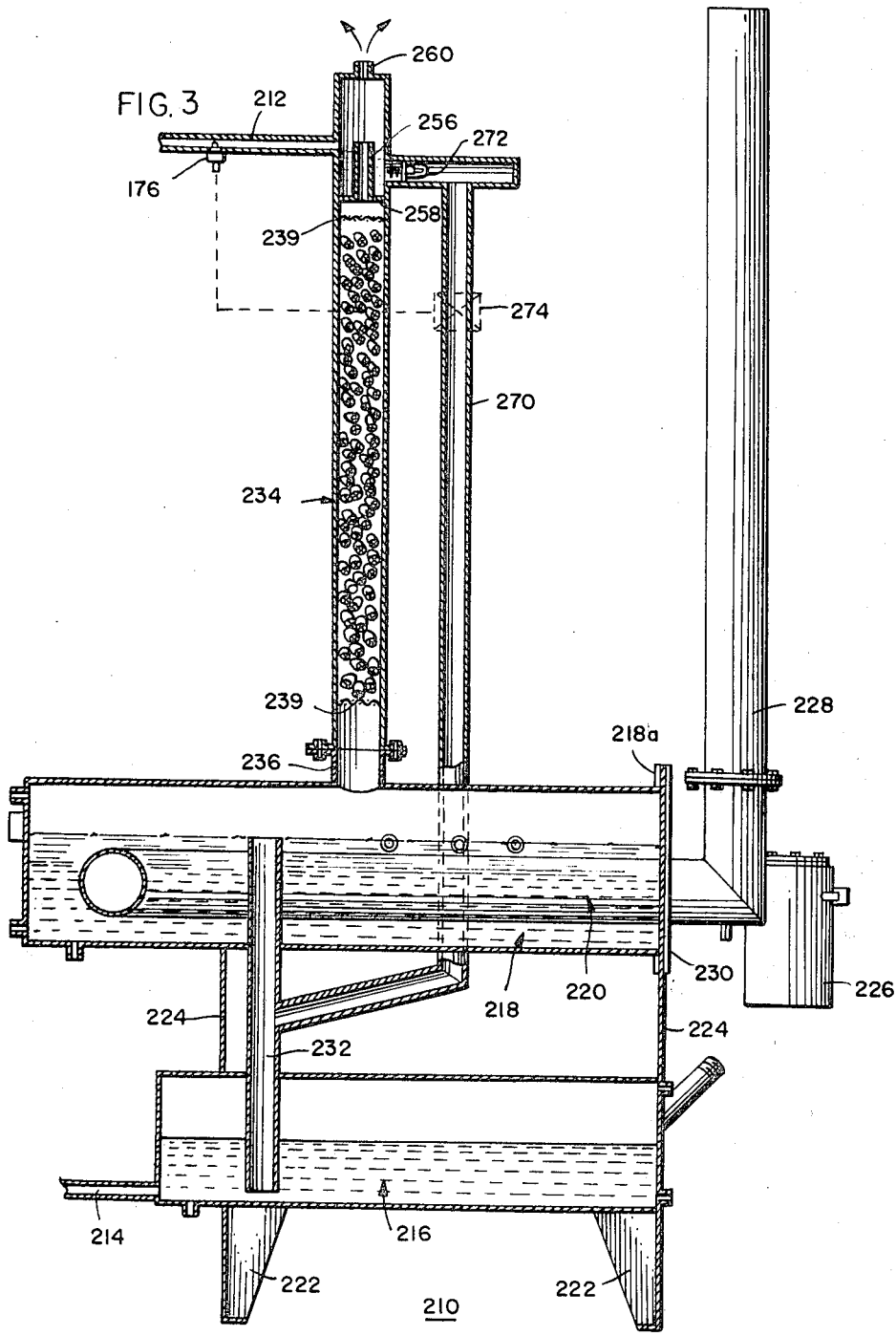

3,443,623
APPARATUS FOR RECONCENTRATING LIQUID DESICCANT
Gene O. Sinex, Farmington, N. Mex., assignor to American Tank and Steel Corporation, Farmington, N. Mex.
Filed Oct. 12, 1966, Ser. No. 586,097
Int. Cl. B01d 1/04
U.S. Cl. 159—31                                        16 Claims

ABSTRACT OF THE DISCLOSURE

An apparatus for reconcentrating liquid dehydrating agents and the like by the removal of moisture therefrom comprising boiler means for holding a quantity of said dehydrating agent, means for heating the boiler means to vaporize the moisture in the dehydrating agent, and sump means in communication with the boiler for collecting reconcentrated dehydrating agent having the moisture removed therefrom. Supply conduit means are provided for directing an incoming flow of wet or rich dehydrating agent into the boiler means for reconcentration therein, and bypass conduit means is provided between the supply conduit means and the sump for diverting the incoming flow of dehydrating agent directly into the sump and, when the temperature of the dehydrating agent reaches a selected value, to avoid overheating and excessive loss of the dehydrating agent.

---

The present invention relates to apparatus for concentrating liquids and, more particularly, to apparatus for reconcentrating liquid dehydrating agents, such as diethylene glycol or triethylene glycol employed in various gas treating systems and well head production units.

One such well fluid treating system is shown and described in the copending United States patent application Ser. No. 532,033, filed Jan. 25, 1966, now U.S. Patent 3,331,188 and the present invention is an improvement on the liquid reconcentrating apparatus thereof and the apparatus shown in the Sinex United States Patent No. 3,132,987, dated May 12, 1964.

Well fluid obtained from oil-gas or natural gas wells generally contains gaseous hydrocarbons, water vapor, water and various liquid hydrocarbons. Many systems have been employed to treat such well fluid in order to separate the liquid components from the gaseous components and for removing water vapor from the separated gaseous hydrocarbons to produce clean, dry, natural gas for storage or distribution through pipe lines.

The gas dehydrating units commonly employed utilize a contactor structure having an extensive surface area whereby the separated gaseous fluid is brought into intimate contact with a liquid desiccant, such as diethylene or triethylene glycol which absorbs almost all of the moisture or water vapor present in the gas. After the liquid desiccant picks up moisture from passage in intimate contact with the gas through the contactor, it is necessary to remove the moisture collected by the liquid desiccant in a reconcentration process so that the desiccant can be recirculated through the system. For this purpose, a reboiler is used for heating the moisture laden desiccant until the moisture and water vapor are driven off, leaving dry, reconcentrated liquid desiccant for recirculation through the system to effect dehydration of the gas in the contactor. In many units the wet glycol leaving the contactor along with a small flow of gas is passed through the power or prime mover side of a glycol pump to drive or power the pumping side thereof which circulates the glycol through the system supplied from a dry glycol sump.

One of the problems associated with this type of equipment is that when the flow of well fluid and gas is interrupted for extended periods, the liquid desiccant, generally glycol, which is circulating through the system, cannot dissipate its heat to the gas and the temperature of the glycol begins to rise. When excessive glycol temperatures approaching the reconcentrating temperature of the desiccant (350° to 375°) are encountered, the vapor pressure of the glycol is elevated so that glycol vapor mixes with the gas and is exhausted from the system, a condition that substantially increases the operating costs because of the necessity of adding glycol to the system to make up for these losses. In addition, excessive glycol temperatures cause damage to the glycol pump and other components and necessitate more frequent repairs thereof.

It is an object of the present invention to provide a new and improved apparatus for reconcentrating liquid dehydrating agents employed in gas treating systems.

Another object of the invention is the provision of a new and improved apparatus for reconcentrating liquid dehydrating agents wherein loss of the dehydrating agent is reduced and operating costs are thereby decreased.

Yet another object of the invention is the provision of a new and improved apparatus for reconcentrating liquid dehydrating agents including means for preventing and eliminating overheating of the dehydrating agent during periods when the gas flow in the gas treating or dehydrating system is interrupted or reduced.

Still another object of the present invention is the provision of a new and improved apparatus for reconcentrating liquid dehydrating agents having means for positively regulating the temperature of the dehydrating agent to prevent excessive losses thereof and to prevent damage to components in the apparatus and associated gas treating system because of extreme temperatures.

Still another object of the present invention is the provision of a new and improved apparatus for reconcentrating liquid dehydrating agents including a reboiler and sump or means for collecting the reconcentrated dehydrating agent and including means for bypassing the returning dehydrating agent directly to the collecting means in response to the temperature of the same to avoid overheating thereof.

Briefly, the foregoing and other objects and advantages are accomplished in one embodiment of the present invention by a new and improved apparatus for reconcentrating liquid dehydrating agents and the like by the removal of moisture therefrom, including boiler means for holding a quantity of the liquid dehydrating agent and means for heating the boiler means to vaporize the moisture from said agent. Sump means are provided for collecting the dehydrating agent from the boiler means after the removal of the moisture therefrom and the dry dehydrating agent is then taken from the sump means for circulation through the gas dehydration system to pick up moisture from the flowing gas therein. After the dehydrating agent has absorbed moisture from the gas, it is returned through supply conduit means to the boiler means for reconcentration therein by the removal of the moisture which was collected from the gas. In order to prevent overheating of the dehydrating agent, which generally results in excessive losses thereof and also results in damage to the various components in the system, such as pumps and the like, a bypass conduit means is provided between the boiler means and the sump means for diverting the returning dehydrating agent directly into the sump means instead of the boiler means when the temperature of the dehydrating agent reaches a selected value. Accordingly, when the gas flow in the associated gas dehydrating system is interrupted for prolonged periods, the temperature of the circulating dehydrating agent begins to increase because no heat is being dissipated to the gas from the dehydrating agent. When this occurs, the temperature responsive bypass conduit operates to bypass the returning dehydrating agent directly to the sump means instead of through the boiler means and, accordingly, an excessive temperature rise in the dehydrating agent is avoided without lowering the temperature of the dehydrating agent in the boiler means. Accordingly, when the gas again begins to flow, a ready supply of dehydrating agent is available for circulation through the system without requiring a long period of time for the boiler means to again be brought up to the desired reconcentrating temperature.

For a better understanding of the present invention reference should be had to the following detailed description taken in conjunction with the drawings, in which:

FIG. 1 is a side elevational view, with portions broken away and in section, of one embodiment of a new and improved apparatus for reconcentrating liquid dehydrating agents in accordance with the present invention;

FIG. 1a is a transverse cross-sectional view through a condenser of the improved dehydrating apparatus taken substantially along lines 1a—1a of FIG. 1.

FIG. 2 is a side elevational view, with portions broken away and in section, of another embodiment of a new and improved apparatus for reconcentrating liquid dehydrating agents in accordance with the present invention; and FIG. 3 is a side elevational view, with portions broken away and in section, of yet another embodiment of a new and improved apparatus for reconcentrating liquid dehydrating agents in accordance with the present invention.

Referring now, more specifically, to the drawings, in FIG. 1 there is shown one embodiment of a new and improved apparatus for reconcentrating liquid dehydrating agents, and the like, constructed in accordance with the present invention and referred to generally by the numeral 10. The apparatus 10 is adapted to reconcentrate liquid dehydrating agents, such as diethylene glycol or triethylene glycol, which are commonly used in gas dehydrating systems (not shown) designed for treating petroleum well fluids, such as those shown and described in the previously mentioned copending application and patent. After the glycol has flowed through the gas contactor in the dehydrating system and becomes wet or laden with moisture absorbed from the gas, it is returned to the reconcentrating apparatus 10 through a supply line or conduit 12. The moisture is removed from the wet glycol in the reconcentrating apparatus and the reconcentrated or dry glycol is then recirculated through the gas dehydrating system via a pipe or conduit 14. One means of circulating the glycol between the gas dehydrator and the reconcentrating apparatus uses the wet glycol passing through the line 12 from the gas contactor to drive a glycol powered pump (not shown) which in turn pumps or circulates dry glycol from the reconcentrating apparatus back through the line 14 to the contactor in the separating vessel. One such glycol powered pump is shown and described in the Kimmell Patent No. 2,999,910, dated Apr. 1, 1957, and in pumping units of this type, a small amount of gas is introduced into the wet glycol in the line 12 which passes into the power side of the pump.

The glycol reconcentrating apparatus 10 comprises a lower storage tank or sump 16, for holding a supply of dry or reconcentrated glycol, and a reboiler vessel 18 which is heated by a fire tube 20 to maintain the glycol therein at a suitable reconcentration temperature (approximately 350° to 375° F.) so that the moisture or water in the glycol is vaporized and moves upwardly from the liquid in the form of steam and minute water droplets. The dry glycol sump 16 is supported on suitable legs 22 and the reboiler 18 is supported thereabove by suitable support plates 24 at opposite ends to form an integral structure including the sump and reboiler. The fire tube 20 is of the conventional U-tube, long flame type, and is positioned to extend horizontally in the reboiler 18 at a level below or adjacent the upper level of the glycol to effect maximum heat transfer to the glycol and prevent overheating of the fire tube. One of the legs of the fire tube 20 is connected with a suitable burner unit 26 preferably fired with gaseous fuel from the associated gas dehydrator unit and the other or outlet leg of the fire tube is connected to an upstanding exhaust stack or flue 28 also adjacent the burner end of the reboiler. Preferably, the reboiler 18 includes a flange 18a adjacent the burner end and a removable end plate 30 is secured to the flange to close the vessel but permit access to the interior thereof when the end plate is removed for repair or replacement of the fire tube.

The reboiler 18 and sump 16 are interconnected by means of a vertical tube 32 having an open upper end which limits the upper level of the glycol in the reboiler. As glycol flows into the reboiler and the upper level rises and reaches the upper end of the tube 32, the glycol spills into the tube and flows downwardly through the tube into the sump and in this manner the upper level of the glycol in the reboiler is maintained at a constant lever which is adjacent or above the fire tube 20. Suitable temperature control means (not shown) are associated with the reboiler and burner unit 26 to regulate the supply of fuel to the burner and thereby maintain the temperature of the glycol at the required reconcentration temperature (approximately 350° to 375° F., depending upon the type of glycol used).

When the temperature of the glycol in the reboiler 18 is continually maintained within the desired reconcentration range, any moisture in the glycol is vaporized or boiled off and rises from the surface of the glycol in the form of steam and minute water droplets. A small amount of glycol vapor may also be carried along with the moisture and, in order to recover this glycol vapor and thereby prevent excessive operating losses of glycol, a condenser 34 is mounted above the reboiler having one end connected thereto by a short upstanding conduit 36. The moisture and small amount of glycol vapor carried therewith leaving the surface of the glycol in the reboiler pass upwardly into the left-hand end (FIG. 1) of the condenser 34 through the connecting tube 36 and flow horizontally toward the opposite end of the condenser. In order to condense and strip or separate the glycol vapor from the water vapor flowing through the condenser, the body of the condenser is filled with packing material 38, such as loosely woven glass wool or the like having strands of stainless steel intermixed therewith at frequent intervals. Reference should be had to the previously mentioned Sinex Patent No. 3,132,987 for a more detailed description and illustration of a suitable packing material that can be used. As the water and glycol capor flows through the packing material, the glycol vapor, having a much higher boiling temperature, condenses in liquid form on the packing material 38 and is collected in the bottom of the condenser for eventual return to the reboiler 18 through the connecting tube 36. The water vapor, having a much lower boiling temperature than the glycol, remains in a vapor state and passes on through the packing material 38 and flows out through the open end (right-hand end) of the condenser into a separator vessel 40 which is in concentric, telescoping alignment with the condenser shell.

The separating vessel 40 is slightly larger in diameter than the shell of the condenser 34 and extends around a portion thereof adjacent the packing material 38 to form an annular, cylindrical chamber 42 surrounding and in heat exchange relation with the packing material carried inside the condenser shell. Suitable sealing rings 44 and 46 are provided to seal the opposite ends of the chamber between the outer wall of the condenser 34 and the wall of the separator vessel 40. The wet glycol supply line 12 is connected to deliver fluid into the left-hand end of the chamber 42 through a suitable fitting or fittings 48 and, as the wet glycol from the supply line 12 flows through the chamber generally from right to left, the glycol picks up heat from the vapors that are flowing through the packing material 38 internally of the condenser. This heat exchange, in turn, cools the vapors flowing in the condenser and aids in condensing and stripping out or separating the glycol vapors from the water vapor.

After the wet glycol passes through the chamber 42 around the condenser 34 it is directed into the opposite end of the separating vessel 40 externally thereof through a conduit 50 having one end connected to the right-hand end of the chamber and the other end extending into the vessel 40. The right-hand end of the separator vessel 40 is closed by an end plate 52 and is supported from the reboiler 18 by means of an upstanding spill pipe or conduit 54 which extends downwardly into the reboiler and has an open lower end spaced between the legs of the U-shaped fire tube 20. The outlet end portion of the conduit 50 includes an elbow which is directed horizontally in order that the wet glycol will flow toward the end plate 52 rather than fall straight down into the reboiler 18 through the spill pipe 54 which is open at its upper end. The wet glycol flows down the end plate 52 and adjacent walls of the separating vessel 40 and is momentarily collected in a liquid well 56 which is in concentric alignment with the spill pipe 54 and includes an annular bottom wall 58 below the level of the upper end of the spill pipe and tower portion of the separator vessel wall. As the wet glycol is delivered into the separating vessel 40, the liquid well 56 fills until the upper level of the liquid reaches the level of the upper end of the spill pipe 54 and this level is maintained as long as flow continues because additional liquid spills over into the spill pipe and flows downwardly into the reboiler 18.

In order that the moisture and water vapor entering the separator vessel 40 from the condenser packing 38 can be vented or exhausted to the atmosphere, a vent pipe 60 is provided between the closed end of the separator vessel 40 and the condenser 34. The vent pipe also permits any well gas carried with the wet glycol through the conduit 50 into the separator 40 to exhaust to the atmosphere. In order to prevent the condensed dry glycol which is stripped out in the packing material 38 of the condenser from flowing down the bottom of the vessel 40 and into the well 56, a dam or weir 62 is placed in the bottom of the vessel 40 between the packing material and the well and, accordingly, the dry glycol condensed out in the packing material 38 can only return to the reboiler 18 through the spill pipe 36, rather than mixing with the incoming wet glycol collected in the well 56.

In accordance with the present invention, the reconcentrating apparatus 10 is equipped with a bypass conduit 70 which extends between the well 56 and the spill pipe 32 which interconnects the reboiler 18 and the sump 16. A thermostatic valve 72 is mounted in the upper end of the bypass conduit adjacent the well, and the valve is operable to open the bypass conduit when the temperature of the glycol collected in the well reaches or rises above a selected temperature. During normal operation of the reconcentrating apparatus, when gas is flowing in the associated gas dehydrating system, the glycol flowing from the contactor and returning through the line 12 carries a considerable quantity of moisture and is relatively low in temperature because of the heat dissipated therefrom to the gas in the contactor. This wet glycol is preheated to some extent as it passes through the chamber 42 surrounding the condenser packing 38 but even when the glycol reaches the well 56 it is generally at a temperature somewhat below the range of 115° to 125° F. The thermostatic control valve 72 can be adjusted and is normally set to maintain the bypass conduit 70 closed when the glycol temperature is below 115° to 125° F. so that all of the glycol from the well 56 will pass directly into the reboiler 18 through the spill pipe or conduit 54.

During prolonged periods when gas flow through the associated gas dehydrating system is interrupted, a condition sometimes encountered in petroleum wells, the glycol returning through the line 12 contains very little moisture and is elevated in temperature because of the lack of heat dissipation from the glycol to the gas in the contactor. When this occurs and the returning glycol in the line 12 generally reaches or exceeds the temperature range of 115° to 125° F., the thermostatic valve 72 then opens to bypass the glycol from the well directly to the sump 16 through the bypass line 70 instead of returning the glycol to the reboiler 18 wherein it will be further elevated in temperature. In this manner, glycol losses from excessive temperatures are eliminated, yet an ample supply of glycol at the reconcentration temperature range of 350° to 375° F. is maintained in the reboiler ready for circulation when the well gas begins to flow again. When normal gas flow through the gas dehydrating system is again resumed, the wet glycol returning from the contactor in the conduit 12 has absorbed moisture from the gas in the contactor and has been cooled considerably by heat transfer to the gas therein. When the temperature of the wet glycol returning from the gas contactor drops below the set actuating temperature of the valve 72 (approximately 115° to 125° F.) the valve closes the bypass conduit 70, which directs all of the returning glycol directly to the reboiler 18 through the spill pipe 54. Accordingly, the reconcentrating apparatus 10 eliminates problems that occur because of elevated glycol temperatures caused when the well fluid flow is interrupted for prolonged periods of time by effecting a more positive control of the glycol temperature.

An alternate means of controlling the flow of glycol through the bypass conduit 70 is also illustrated in FIG. 1 and includes a thermostatically controlled motor valve 74 (dotted lines) which is placed in the bypass conduit instead of the valve 72. The valve 74 is adapted to be pneumatically controlled by a temperature sensitive element 76 which may be located in the glycol conduit 12 upstream from the condenser chamber 42. Accordingly, bypassing of the glycol to the sump 16 is controlled in response to the temperature of the glycol in the conduit 12 upstream from the condenser rather than from the glycol temperature in the well 56 and, hence, the bypass action may be effected somewhat sooner after a stoppage of gas flow in the associated gas dehydrating system than with the valve 72, which is sensitive to the glycol temperature in the well 56.

Referring now to FIG. 2, therein is illustrated another embodiment of an apparatus for reconcentrating liquid dehydrating agents in accordance with the present invention which is referred to generally with the reference numeral 110. The apparatus 110 is similar in many aspects to the apparatus 10 previously described and, accordingly, reference numerals having the prefix "1" will be used where possible to identify components of the apparatus 110 which are similar in construction or function to those of the apparatus 10.

Instead of a horizontally extending condenser for condensing the glycol vapor out of the water vapor that is boiled off in the reboiler 118, the apparatus 110 includes a vertically upstanding, reflux tower or column 134 having its lower end connected to an outlet fitting 136 in the top of the reboiler. The reflux tower 134 is closed at its upper end with a cover plate having an open vent pipe 160 to permit the vaporized moisture entering the lower end of the reflux tower and flowing upwardly therein to exhaust into the atmosphere. Throughout a substantial portion of its length, the reflux tower is filled with a packing medium 138 for collecting and accumulating condensed glycol vapors which then flow downwardly through the tower into the reboiler 118 countercurrent to the upwardly flowing stream of water and glycol vapors leaving the reboiler. The packing medium may take the form of a plurality of short, tubular members constructed of ceramic material, or the like, which is resistant to corrosion from the water and glycol vapors in the tower at the temperatures encountered. The ceramic tubular packing material provides a large surface area on which the glycol vapors may readily condense in liquid form and gradually form droplets which are heavy enough to flow downwardly against the rising vapors. The column of packing material 138 is contained and supported in the reflux tower 134 by means of a pair of upper and lower screen members 139 which present little resistance to the upward flow of vapors or the downward flow of condensed, liquid glycol.

The lower portion of the reflux tower 134 operates at a temperature approximately the same as, or slightly less than, the reconcentration temperature of the glycol in the reboiler 118 (350° to 375° F.) and the temperature in the tower progressively decreases upon upward movement toward the upper end of the packing material 138. Adjacent the upper end of the packing material the temperature is still considerably above the boiling point of water vapor so that the water vapor continues upwardly without condensing and passes to the atmosphere through the vent 160. Thus, as the water and glycol vapors enter the reflux tower from the reboiler 118, the glycol vapors are cooled and condense on the packing material 138. This condensed glycol vapor returns down the reflux tower into the reboiler against the stream of rising vapors while the moisture or water vapor continues to flow on upwardly through the reflux tower without condensing and is vented to the atmosphere. Accordingly, almost all of the glycol vapor leaving the reboiler 118 is stripped out in the reflux tower 134 and is returned to the reboiler, which greatly reduces the amount of makeup glycol needed during operation.

In accordance with the present invention, the wet glycol returning to the apparatus 110 from the associated gas dehydrating system flows through the supply conduit 112 into a preheat coil 142 located in the upper end of the reflux tower 134 above the packing material 138. The wet glycol flowing through the coil 142 is heated by the water vapor passing upwardly through the tower which flows around the coil before passing out through the vent 160. The glycol leaving the coil 142 is then directed into the upper end of a vertical standpipe 156 through a suitable conduit 150.

The standpipe 156 is closed at its lower end with a bottom wall 158 and is interconnected to the reflux tower 134 by an upper vent line 157 and a transverse conduit 159 intermediate the upper and lower ends of the packing material 138. The lower conduit 159 is located above the lower end of the standpipe 156 and, accordingly, a well or head of liquid glycol is maintained in the standpipe with its upper level even with the conduit 159. During normal operation, the returning wet glycol flowing into the standpipe 156 collects in the liquid well and then overflows through the conduit 159 into the packing material 138 at approximately its midpoint. The wet glycol flowing into the reflux tower through the conduit 159 normally contains moisture, some of which is vaporized by the rising vapors in the reflux tower and, consequently, when this glycol eventually reaches the reboiler 118 much of the moisture originally carried therein has been removed. The addition of wet glycol from the conduit 159 into the reflux tower 134 also aids in condensing the glycol vapors rising upwardly from the reboiler 118 and increases the operating efficiency of the reflux tower in stripping out the glycol from the water vapor. Also, the glycol introduced into the reflux tower through the conduit 159 is preheated considerably by the time it reaches the reboiler 118 and, consequently, less heat is required in the reboiler to bring this glycol up to the reconcentrating temperature.

When the gas flow in the associated dehydrating system is interrupted or greatly reduced for prolonged periods, the glycol, though continuing to circulate between the reconcentrating apparatus and the gas dehydrator, contains little moisture and begins to elevate in temperature because its heat is no longer dissipated to the gas in the contactor of the gas dehydrating system. In order to prevent excessive glycol temperature and avoid the losses and maintenance problems incurred thereby, the reconcentrating apparatus includes a bypass conduit 170 which is connected between the lower end of the standpipe 156 and the interconnecting spill pipe 132 between the dry glycol sump tank 116 and the reboiler 118. A thermostatic valve 172 is mounted in the bypass conduit 170 adjacent the upper end and in close proximity to the lower end of the standpipe 156. The thermostatic valve 172 is thus directly sensitive to the temperature of the glycol well in the lower end of the standpipe 156, and when the glycol reaches a selected temperature range (approximately 115° to 125° F.), the valve 172 opens to bypass the returning glycol directly to the sump 116 instead of the reboiler 118. In this manner overheating of the glycol is avoided, yet an ample supply of dry glycol at reconcentration temperature is maintained in the reboiler in readiness for circulation when the gas flow through the associate dehydrating system is resumed.

Instead of the valve 172, which is directly responsive to the temperature of the glycol in the lower end of the standpipe 156, the bypass conduit 170, as an alternative, may be provided with a remotely controlled, temperature actuated valve 174. The valve 174 is controlled by means of a temperature sensitive element 176 located in the inlet supply conduit 112 upstream of the reflux tower 134 and, hence, senses the glycol temperature before it is preheated in the coil 142.

Referring now to FIG. 3 of the drawings, therein is illustrated yet another embodiment of an apparatus for reconcentrating liquid dehydrating agents and the like constructed in accordance with the present invention and referred to generally by the reference numeral 210. The apparatus 210 is similar in many respects to the apparatus 110 and, accordingly, reference numerals having the prefix "2" will be used where possible to identify components of the latter apparatus similar in construction or function to those of the apparatus 110.

The apparatus 210 utilizes a vertical reflux tower 234 similar to the reflux tower 134 of the previous embodiment, and the main difference in the two embodiments is the manner in which the incoming wet glycol in the line 212 is distributed in the apparatus.

A glycol liquid well is formed in the upper end portion of the reflux tower 234 above the packing material 238 by means of an annular bottom wall 258 and upstanding spill pipe 256. Incoming dehydrating agent from the conduit 212 flows directly into the tower 234 above the bottom of the well 258 and begins to collect until reaching the upper end of the spill pipe 256. After reaching this level the glycol spills over into the spill pipe and flows downwardly through the packing material 238 through its entire length and then passes into the reboiler. The downwardly moving wet glycol in the packing material 238 flows counter to the upwardly flowing water and glycol vapors from the reboiler 218 and helps to condense and strip out the glycol vapors from the water vapor which flows upwardly through the spill pipe 256 and is vented to the atmosphere through the vent pipe 260 at the upper end of the reflux tower. During this process, the glycol is preheated by the rising vapor and is elevated considerably in temperature by the tme it reaches the lower end of the reflux tower and falls into the boiler.

In accordance with the present invention, a bypass conduit 270 is connected between the upper end of the reflux tower 234 above the well bottom 258 and the spill pipe 232 between the dry glycol sump 216 and reboiler 218. A thermostatic control valve 272, sensitive to the temperature of the glycol collected in the well reaches a selected value, the valve opens to bypass the glycol directly to the sump 216 instead of the reboiler 218. Accordingly, the glycol temperature is maintained at a suitable low level during periods when the gas flow into the associated dehydrating system is interrupted. If desired, the valve 272 which is directly sensitive to the temperature of the glycol collected in the well can be replaced with a remotely controlled valve 274 which is controlled by a temperature sensitive element 276 located in the conduit 212 upstream of the reflux tower 234.

The present invention, as described and shown in the illustrative embodiments, provides a new and improved apparatus for reconcentrating liquid dehydrating agents in which overheating of the dehydrating agent is positively prevented during periods of reduced flow or flow stoppage of the well fluid in the associated gas dehydrating system. The apparatus permits continued circulation of the dehydrating agent between the apparatus and gas dehydrator during these periods, and also provides an ample supply of reconcentrated dehydrating agent ready for use when normal gas flow resumes.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Apparatus for reconcentrating liquid dehydrating agents and the like by the removal of moisture therefrom absorbed in a gas contactor of a gas dehydrating system, comprising boiler means for holding a quantity of said dehydrating agent, means for heating said boiler means to vaporize the moisture in said dehydrating agent, sump means in communication with said boiler means for collecting said dehydrating agent having the moisture removed therefrom, supply conduit means for directing an incoming flow of dehydrating agent into said boiler means, and bypass conduit means between said supply conduit means and said sump means for diverting said incoming flow of dehydrating agent directly into said sump means when the temperature of said dehydrating agent reaches a preselected value in excess of approximately 115° F.

2. The apparatus of claim 1 wherein said bypass conduit means includes temperature responsive valve means operable to open said bypass conduit when said incoming dehydrating agent reaches said selected temperature value and operable to close below said selected value.

3. The apparatus of claim 1 including condenser means for receiving vapors from said boiler means, said condenser means including vent means for exhausting vaporized moisture therefrom and means for returning condensed dehydrating agent to said boiler means.

4. The apparatus of claim 3 wherein at least a portion of said supply conduit means is arranged in heat exchange relation with said condenser means and including temperature sensitive means in said supply conduit means upstream of said condenser means for opening said bypass conduit means to divert said incoming flow of dehydrating agent into said sump means.

5. The apparatus of claim 4 wherein said bypass conduit means includes motor valve means operatively interconnected with said temperature sensitive means.

6. The apparatus of claim 3 wherein said condenser means includes a horizontally extending chamber having one end connected with said boiler means to receive vapors therefrom and including packing means within said chamber adjacent said one end for collecting liquefied dehydrating agent from said vapors, said supply conduit means including jacket means around said chamber adjacent said packing means for cooling said vapors passing through and condensing on said packing means.

7. The apparatus of claim 6 wherein the opposite end of said chamber forms a portion of said supply conduit means and includes a liquid collecting well in communication with said boiler means, said vent means being positioned to vent said chamber to the atmosphere intermediate said packing means and said well.

8. The apparatus of claim 7 wherein said bypass conduit means extends between said well and said sump means and includes thermostatic valve means responsive to the temperature of said dehydrating agent in said well operable to open said bypass means when the temperature reaches said selected value.

9. The apparatus of claim 7 wherein said bypass conduit means extends between said well and said sump means and includes valve means operable to open said bypass in response to a selected temperature of said dehydrating agent upstream of said jacket means in said supply conduit means.

10. Apparatus for reconcentrating liquid dehydrating agents and the like by removal of moisture therefrom absorbed in a gas contactor of a gas dehydrating system, comprising boiler means for holding a quantity of said dehydrating agent, means for heating said boiler means to vaporize the moisture in said dehydrating agent, condenser means for receiving vapors from said boiler means including vent means for exhausting vaporized moisture therefrom and means for returning condensed dehydrating agent to said boiler means, sump means in communication with said boiler means for collecting said dehydrating agent having the moisture removed therefrom, supply conduit means for directing an incoming flow of dehydrating agent into said boiler means, and bypass conduit means between said supply conduit means and said sump means for diverting said incoming flow of dehydrating agent directly into said sump means when the temperature of said dehydrating agent reaches a preselected value in excess of approximately 115° F.

11. The apparatus of claim 10 wherein said condenser means comprises a vertically upstanding reflux tower including packing means therein for collecting condensed dehydrating agent and having its lower end in communication with said boiler means and moisture vent means at the upper end, said reflux tower forming a portion of said supply conduit means adapted to direct said incoming flow of dehydrating fluid downwardly through said packing means into said boiler means.

12. The apparatus of claim 11 wherein said bypass conduit means includes thermostatic valve means operable to open in response to a selected temperature of the incoming flow of dehydrating agent in said supply conduit-forming portion of said reflux tower.

13. The apparatus of claim 12 wherein said bypass conduit means includes thermostatic valve means operable to open in response to a selected temperature of the dehydrating agent in said supply conduit means upstream of said reflux tower.

14. The apparatus of claim 11 wherein said supply conduit means includes well means for holding a quantity of said dehydrating agent adjacent the upper end of said reflux tower and said bypass conduit means includes thermostatic valve means operable to open in response to a selected temperature of said dehydrating agent in said well means.

15. The apparatus of claim 11 wherein said supply conduit means includes heat exchange means in said reflux tower above said packing means and standpipe means externally of said reflux tower for directing the dehydrating agent passing through said heat exchange means into said reflux tower beneath the upper level of said packing means.

16. The apparatus of claim 15 wherein said bypass conduit means is connected with said standpipe means adjacent its lower end and includes thermostatic valve means operable to open in response to a selected temperature of said dehydrating agent in said standpipe means.

(References on following page)

References Cited

UNITED STATES PATENTS

| | | | |
|---|---|---|---|
| 2,750,331 | 6/1956 | Meyers | 159—31 X |
| 2,798,570 | 7/1957 | Kelley | 55—32 X |
| 3,105,748 | 10/1963 | Stahl | 159—31 X |
| 3,132,987 | 5/1964 | Sinex | 55—32 X |
| 3,162,515 | 12/1964 | Connors et al. | 55—32 |
| 3,182,434 | 5/1965 | Fryar | 55—32 |
| 3,254,473 | 6/1966 | Fryar et al. | 159—31 X |
| 3,347,019 | 10/1967 | Barnhart | 55—32 |
| 3,362,891 | 1/1968 | Meyers | 203—59 |

FOREIGN PATENTS

| | | |
|---|---|---|
| 285,936 | 2/1928 | Great Britain. |

NORMAN YUDKOFF, *Primary Examiner.*

F. E. DRUMMOND, *Assistant Examiner.*

U.S. Cl. X.R.

55—32; 159—44; 202—160